United States Patent
Falana et al.

(10) Patent No.: US 7,915,203 B2
(45) Date of Patent: Mar. 29, 2011

(54) SECONDARY EMULSIFIERS FOR INVERTED EMULSION FLUIDS AND METHODS FOR MAKING AND USING SAME

(75) Inventors: Olusegun Matthew Falana, San Antonio, TX (US); Arthur T. Gilmer, The Woodlands, TX (US); Edward Marshall, Sehute, TX (US)

(73) Assignee: Clearwater International, LLC DE (US)

( * ) Notice: Subject to any disclaimer, the term of this patent is extended or adjusted under 35 U.S.C. 154(b) by 22 days.

(21) Appl. No.: 12/510,101

(22) Filed: Jul. 27, 2009

(65) Prior Publication Data

US 2011/0021385 A1    Jan. 27, 2011

(51) Int. Cl.
*C09K 8/36* (2006.01)
*B01F 17/00* (2006.01)
*B01F 3/08* (2006.01)

(52) U.S. Cl. .......... 507/138; 175/65; 507/127; 507/128; 507/129; 507/134; 516/21; 516/23; 516/24; 516/27

(58) Field of Classification Search .................. 507/138, 507/127, 128, 129, 134; 175/65; 516/21, 516/23, 24, 27
See application file for complete search history.

(56) References Cited

U.S. PATENT DOCUMENTS

| | | | | |
|---|---|---|---|---|
| 2008/0287324 | A1* | 11/2008 | Pursley et al. | 507/218 |
| 2009/0200027 | A1* | 8/2009 | Kakadjian et al. | 166/270.1 |
| 2009/0275488 | A1* | 11/2009 | Zamora et al. | 507/204 |

* cited by examiner

*Primary Examiner* — Timothy J. Kugel
(74) *Attorney, Agent, or Firm* — Robert W Strozier

(57) ABSTRACT

A new class of secondary emulsifying agents for use in inverted mud and other inverted system is disclosed and method for making and using same.

11 Claims, No Drawings

SECONDARY EMULSIFIERS FOR INVERTED EMULSION FLUIDS AND METHODS FOR MAKING AND USING SAME

BACKGROUND OF THE INVENTION

1. Field of the Invention

Embodiments of the present invention relate to inverted emulsion fluids for use in oil/gas field applications and to methods for making and using the fluids.

More particularly, embodiments of the present invention relate to inverted emulsion fluids for use in oil/gas field applications, where the fluids include at least one novel secondary emulsifying agent and to methods for making and using the fluids and the secondary emulsifying agents.

2. Description of the Related Art

In inverted emulsion systems, such as inverted emulsion drilling fluid (IEDF) systems, water is the internal phase or discontinuous phase, while oil is the continuous phase. Inverted emulsion systems are formulated using primary and secondary emulsifiers. The systems can also include other additives as well. Primary emulsifiers are used to reduce interfacial tension between the liquid phases and hence make the internal phase dispersible, while secondary emulsifiers consolidate stability of the dispersed phase or stability of the emulsion. In inverted emulsion systems, stability is always an issue. Stability of such systems is generally determined by measuring electrical stability (ES). The voltage required to destabilize the dispersed phase is recorded as the ES value. The higher the ES value, the more stable the emulsion. Not only is a high ES needed for IEDF systems, but the emulsifiers also should maintain rheological properties of the systems to improve functionality.

In the prior art, the general approach for inverted emulsion fluid is to use fatty acid soaps, like calcium oleate. Moreover, amines, hydroxylamine, amides, sulfonates or sulfates, or similar compounds have been used either neat or as mixtures for producing inverted emulsion fluids.

Although numerous inverted emulsion fluid systems have been disclosed and implemented, there is still a need in the art for secondary emulsifiers that are effective and efficient at low dosage and offer thermally stable inverted emulsion fluid systems.

SUMMARY OF THE INVENTION

Embodiments of the present invention provide a novel class of secondary emulsifiers, where the emulsifiers comprises an alkyl, aryl ester, where the alkyl group (designated sometimes herein as $R^1$) is a carbyl group having between about 10 and about 40 carbon atoms and where the aryl group (designated sometimes herein as A) has between 5 and 20 carbon atoms and includes one substituent or a plurality of substituents, where the substituent(s) include(s) a halogen atom, a R group, a $SO_3R^3$ group, an $OPO_2R^3$ group, an $OPO_3R^3$ group, a $NHR^2$ group, a $SiH_2R^2$ group, a $PHR^2$ group, a $SR^2$ group or a $OR^2$ group, where R is a carbyl group having between about 1 and about 40 carbon atoms, $R^2$ is a carbyl group having between about 1 and 40 carbon atoms, $R^3$ is a hydrogen atom or a carbyl group having between 1 and 12 carbon atoms, where and where one or more of the carbon atoms in A, R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^2$, and/or mixtures thereof and where $R^4$ can be an alkyl, aryl, alkylaryl or arylalkyl group having between 1-20 carbon atoms where one or more carbon or hydrogen atom can be replaced as set forth for A, R, $R^1$, $R^2$ or $R^3$.

Embodiments of the present invention provide a novel class of secondary emulsifiers, where the emulsifiers are a compound of the general formula (I):

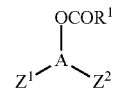

where (a) A is an aryl group having between 5 and 20 carbon atoms, (b) $R^1$ is a carbyl group having between about 10 and about 40 carbon atoms, (c) $Z^1$ is a halogen atom, R group, $SO_3R^3$ group, $OPO_2R^3$ group, or $OPO_3R^3$ group, where R is a carbyl group having between about 1 and about 40 carbon atoms and $R^3$ is a hydrogen atom or a carbyl group having between 1 and 12 carbon atoms, and (d) $Z^2$ is a hydrogen atom, $NHR^2$ group, $SiH_2R^2$ group, $PHR^2$ group, $SR^2$ group or $OR^2$ group, where $R^2$ is a carbyl group having between about 1 and 40 carbon atoms, and where one or more of the carbon atoms in A, R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for A, R, $R^1$, $R^2$ or $R^3$.

Embodiments of the present invention provide a novel class of secondary emulsifiers, where the emulsifiers are a compound of the general formula (II):

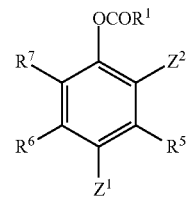

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, (c) $Z^2$ is a hydrogen atom, $NHR^2$ group, $OR^2$ group, $SiH_2R^2$ group, $PHR^2$ group, or $SR^2$ group, where $R^2$ is a carbyl group having between about 1 and 40 carbon atoms, (d) $R^5$ is a hydrogen atom or a carbyl group, (e) $R^6$ is a hydrogen atom or a carbyl group, and (f) $R^7$ is a hydrogen atom or a carbyl group, where the carbyl group have between 1 carbon atoms and about 10 carbon atoms, and where one or more of the carbon atoms in R, $R^1$, $R^2$, $R^5$, $R^6$, or $R^7$ can be replaced by B, N, O, Si, P, S, Ge and/or mixtures thereof and one or more of the hydrogen atoms in R, $R^1$, $R^2$, $R^5$, $R^6$, or $R^7$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$, $R^5$, $R^6$, or $R^7$.

Embodiments of the present invention provide a novel class of secondary emulsifiers, where the emulsifiers are a compound of the general formula (III):

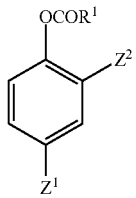

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, and (c) $Z^2$ is a hydrogen atom, $NHR^2$ group, $OR^2$ group, $SiH_2R^2$ group, $PHR^2$ group, or $SR^2$ group, where $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$ and $R^3$.

Embodiments of the present invention provide a novel class of secondary emulsifiers, where the emulsifiers are a compound of the general formula (IV):

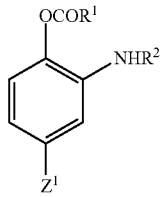

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, (c) $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and $R^4$ can be a alkyl, aryl, alkylaryl or arylalkyl group having between 1-20 carbon atoms where one or more carbon or hydrogen atom can be replaced as set forth for R, $R^1$, $R^2$ and $R^3$.

Embodiments of the present invention provide a novel class of secondary emulsifiers, where the emulsifiers are a compound of the general formula (V):

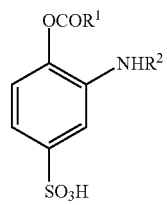

where (a) $R^1$ is a carbyl group having between about 10 and about 40 carbon atoms, (b) $R^2$ is a carbyl group having between about 1 and 40 carbon atoms, and where one or more of the carbon atoms in $R^1$ or $R^2$ can be replaced by B, N, O, Si, P, S, Ge, and/or mixtures thereof and where one or more of the hydrogen atoms in $R^1$ or $R^2$ can be replaced by F, Cl, Br, I, $CONR_2^4$, $COOR^4$, $OR^4$, $NR_2^4$, $SR^4$, $PR_2^4$, and/or mixtures thereof and $R^4$ can be a alkyl, aryl, alkylaryl or arylalkyl group having between 1-20 carbon atoms where one or more carbon or hydrogen atom can be replaced as set forth for $R^1$ or $R^2$.

Embodiments of the present invention provide a novel class of secondary emulsifiers, where the emulsifiers are a compound of the general formula (VI):

(VI)

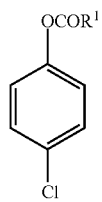

where $R^1$ is a carbyl group having between about 10 and about 40 carbon atoms and where one or more of the carbon atoms in $R^1$ can be replaced by B, N, O, Si, P, S, Ge, and/or mixtures thereof and one or more of the hydrogen atoms in $R^1$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for $R^1$.

Embodiments of the present invention provide inverted emulsion compositions including one or more compounds of formulas (I-VI).

Embodiments of the present invention provide methods for preparing the compounds of formulas (I-VI).

Embodiments of the present invention provide methods for using the compounds of formulas (I-VI) for making inverted emulsions.

Embodiments of the present invention provide for using inverted emulsions in oil field applications.

DETAILED DESCRIPTION OF THE INVENTION

The inventors have found that a new class of secondary emulsifiers including one or more compounds of Formulas (I-VI) can be used to formulate inverted emulsion drilling fluid (IEDF) systems that have improved stability as measured by their ES values and the same time maintaining rheological properties of the systems to improve functionality of the IEDF systems. The inventors have found that such secondary emulsifiers were formulated to produce IEDF systems having superior ES values (exceeding 1,000 volts) compared to IEDF without such secondary emulsifiers and at concentration less than or equal to about 0.2 wt. % of the secondary emulsifiers in the formulation. The inventors designed secondary emulsifiers to have multiple functional groups capable of migrating to the oil-water interface and to kinetically stabilize IEDF systems.

Employment of novel compounds: compound 3 (or its analogues), and compound 1. The former is unknown to the best of our knowledge, while the later has not been reported to be used as (neither a primary nor secondary) emulsifier. Besides novelty of compound 3, it uniquely possesses an ester (long chain), sulfonate, amine or amide and aromatic moieties. These moieties confer amphipathic, electrostatic, surface active and steric hindrance properties essential for stability of dispersed water in the continuous oil phase. The polarity conferred on compound 1 by the aromatic chloro moiety is essential in rendering it a non-ionic amphipathic.

Three novel esters have been synthesized and found to produce desirable electrical stability (ES) values when explored as emulsifiers in IEDF. Depending on the nature of base oil and test conditions, ES values range from 532 V to 1,147 V with concentrations between 0.2 g to 2.0 g of the novel emulsifiers in 24% (w/w) solution of A-6332 (a primary emulsifying agent available from Weatherford International) in number 2 Diesel. Thus, using the emulsifiers as dopants ES value of 800 V were exceeded. Of importance is the greatest positive affect of the additives at 0.2 g concentration in the 24% cut solutions with little gain in stability (maximum of 150 V) even at 2.0 g concentration. Remarkably, resultant emulsions were found to be stable at 400° F. and compatible with yellow/red diesel and synthetic oil.

Emulsifiers are used to minimize effects of drill solids on rheological properties of oil-muds. Characteristics of geological formation usually dictates the choice of fluid system that is selected. Generally, a mud system contains a continuous phase (water or oil), and suspended solutes or solids such as organophillic clay, emulsifier, alkaline solution (lime), brine (CaCl2), fluid loss control additive, gellant and weighting agent, say barite. Thus, when the continuous fluid is water, it is referred to by those skilled in the art as water-based mud whereas when the continuous phase is oil, it is called oil-based mud. Oil-based muds are subdivided into oil muds or oil-in-water muds and oil emulsion muds or water-in-oil emulsions commonly called inverted or invert emulsions (IE). While oil-in-water muds contain about 5% or less water, IE contain between 10 to 60% water emulsified in the liquid phase. Oil muds are used to drill active shales, water soluble formation or salt, gypsum or related evaporite formations; preferred for drilling noxious gas laden and high temperature environments. Still, skilled artisans prefer oil-based muds for casing packs and packer fluids, precluding differential sticking, drilling deep-hot wells, coring and protection of production zones.

Suitable Reagents

Suitable primary emulsifiers for use in the formulations of this invention include, without limitation, any primary emulsifying agents used in forming inverted emulsion compositions and muds for use in oil field application. Exemplary examples of primary emulsifiers include, without limitation, fatty acid salts, amidoamine fatty acid salts, and mixtures or combinations thereof. Other suitable primary emulsifier can be found in U.S. Pat. Nos. 4,012,329; 4,108,779; 5,508,258; 5,559,085; 6,608,006; 7,125,826; 7,285,515; and 7,449,846, as set forth in the last paragraph of this application, these references are incorporated by reference in conformity to United States Laws, Rules and Regulations. These references also disclose other secondary emulsifiers that can be used in combination with the new secondary emulsifiers of this invention.

Suitable aromatic compounds include, without limitation, phenol, substituted phenols, hydroxylated naphthalenes, substituted hydroxylated naphthalenes, hydroxylated anthracenes, substituted hydroxylated anthracenes, hydroxylated phenanthrenes, substituted hydroxylated phenanthrenes, hydroxylated chrysenes, substituted hydroxylated chrysenes, hydroxylated pyrenes, substituted hydroxylated pyrenes, hydroxylated corannulenes, substituted hydroxylated corannulenes, hydroxylated coronenes, substituted hydroxylated coronenes, hydroxylated hexahelicenes, substituted hydroxylated hexahelicenes, hetero analogs, where the hetero atom is B, N, O, Si, P, or S and the substituents can be halogen atoms, carbyl groups (R), alkoxy groups (OR), amino (NRR'), amido groups (CONHR), sulfide groups (SR), silyl groups (SiRR'R"), or the like, and where the hydroxy group is capable of being esterified and mixtures or combinations thereof.

Suitable acid, acid chlorides or anhydrides for use in making the secondary emulsifiers of this invention include, without limitation, Myristoleic acid Palmitoleic acid, Oleic acid, Linoleic acid, α-Linolenic acid, Arachidonic acid, Eicosapentaenoic acid, Erucic acid, Docosahexaenoic acid, Capric acid or Decanoic acid, Undecanoic acid, Lauric acid or Dodecanoic acid, Tridecanoic acid, Myristic acid or Tetradecanoic acid, Palmitic acid or Hexadecanoic acid, Stearic acid or Octadecanoic acid, and Arachidic acid or Eicosanoic acid, their anhydrides and their acid chlorides, and mixtures or combinations thereof.

EXPERIMENTS OF THE INVENTION

General Esterification Procedure

EXAMPLE 1

This example illustrates the esterification of propylene glycol

To a mixture of propylene glycol (7.5 g) in a three-necked round bottom flask (250 mL size) and pyridine (60 mL), was added palmitoyl chloride (60 mL) slowly over 10 min. The mixture was refluxed using a heating mantle for 3 hours. After refluxing, 20 g of ice and 50 mL HCl (~32%) were slowly added to the solution until the solution was acidic (less or more of the acid might be needed, check with pH after adding say 30 mL).

The organic layer was separated or extracted with chloroform and separated. The organic layer was then concentrated under vacuum to give 4.

Although pyridine was used to catalyze the reaction, the reaction can also be catalyzed by an acid or the reaction can be performed with heat as a catalyst.

EXAMPLE 2

This example illustrates a general synthesis of secondary emulsifiers of this invention.

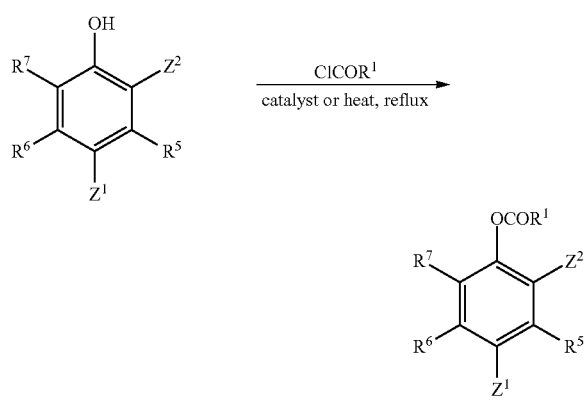

where (a) R¹ is a carbyl group having between about 10 and about 40 carbon atoms, (b) $Z^1$ is a halogen atom, $SO_3R^3$ group, $OPO_2R^3$ group, or $OPO_3R^3$ group, where $R^3$ is a hydrogen atom or a carbyl group having between 1 and 12 carbon atoms, (c) $Z^2$ is a hydrogen atom or an $NHR^2$ group, where $R^2$ is a carbyl group having between about 1 and 40 carbon atoms, (d) $R^5$ is a hydrogen atom or a carbyl group, (e) $R^6$ is a hydrogen atom or a carbyl group, and (f) $R^7$ is a hydrogen atom or a carbyl group, where the carbyl group have between 1 carbon atoms and about 10 carbon atoms, and where one or more of the carbon atoms in $R^1$, $R^2$, $R^5$, $R^6$, or $R^7$ can be replaced by B, N, O, Si, P, S, Ge and/or mixtures thereof and one or more of the hydrogen atoms in $R^1$, $R^2$, $R^5$, $R^6$, or $R^7$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for $R^1$, $R^2$, $R^5$, $R^6$, or $R^7$. In addition to phenol, any aromatic hydroxy compound can be used including hydroxylated naphthylene, hydroxylated anthracene, hydroxylated phenantrene, or other hydroxylated aromatics.

The general procedure is to add the phenol or hydroxylated aromatic to a flask add a acid chloride, an anhydride, or an acid and reflux the mixture in the presence of a catalyst such as a base or an acid or thermally.

EXAMPLE 3

This example illustrates the synthesis of 4-chlorophenylpalmitate designated compound 1.

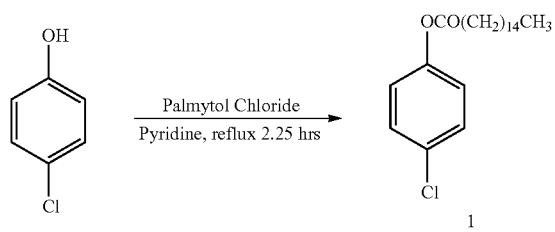

To a mixture of p-chlorophenol (0.389 mol) and pyridine (150 mL) was added palmitoyl chloride (0.389 mol) over 5 min period. White precipitates were seen when about 75% of the palmitoyl chloride had been added, but a yellowish solution (T=35° C.) was obtained after the entire reagent was added. The resultant yellow solution was heated to reflux and maintained for 2 hours 15 minutes or 2.25 hours.

Upon cooling, two immiscible liquids were obtained. The light aqueous layer was treated with HCl (100 mL, 35%) followed by filtration to give yellow solid filtration residue. The residue was combined with the viscous organic layer, dissolved in chloroform (200 mL), washed sequentially with dilute HCl (2×100 mL), deionized water (2×200 mL) and dried with magnesium sulfate. The resultant organic mixture was concentrated under vacuum to give an off-white solid (mp 53-55° C., yield 0.386 mol).

EXAMPLE 4

This example illustrates synthesis of 4-allyl-2-methoxyphenylpalmitate designated compound 2.

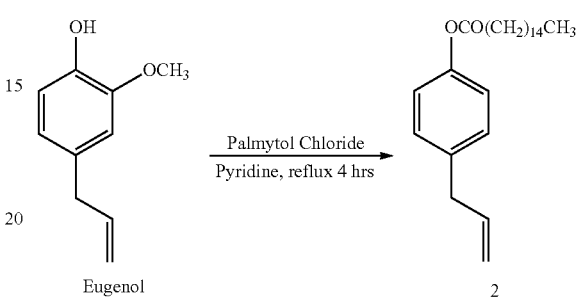

The same method described above was explored for synthesis of compound 2. Quantities: palmitoyl chloride (0.132 mol); eugenol (0.132 mol). Compound 2 is a pleasant smelling brown solid, mp 36-38° C., yield, 97.44%.

EXAMPLE 5

This example illustrates synthesis of 3-amino-4-(palmitoyloxy)benzenesulfonic acid designated compound 3.

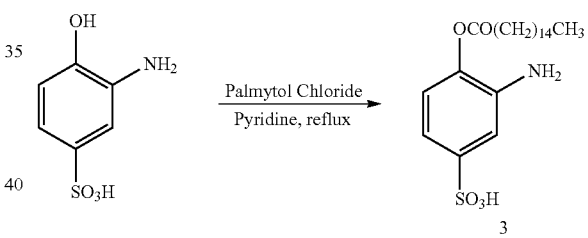

The same method described above was explored for synthesis of compound 3. Quantities: palmitoyl chloride (0.053 mol); 3-amino-4-hydroxybenzenesulfonic acid (0.053 mol). Compound compound 3 is a honey like sweet smelling viscous to paste off-white reaction product; Yield: 0.124 mol.

EXAMPLE 6

This example illustrates a general procedures for secondary emulsifier QC in a mud.

To 280 mL of diesel were add 6 g organophilic clay and 10 mL of a secondary emulsifier and the resulting mixtures was mixed for 5 minutes. To this mixture was added 70 mL of an 10.8 lbs/gal $CaCl_2$ solution and the resulting mixtures was mixed for 10 minutes. To this mixtures was added 300 g of barite and the resulting mixtures was mixed 30 minutes.

The resulting mixtures was tested by its rheological properties and its ES value at 150° F. and the data recorded.

Electrical Stability & Rheological Evaluations

Inverted Emulsion Fluids were prepared using the following method. To measured amount of diesel (280 mL or synthetic oil and the like) organophillic clay (6 g) was added followed by adding primary emulsifier (10 g, also serves as secondary emulsifier). The mixture was mixed for 5 min on Hamilton Beach mixer. Brine (CaCl$_2$, 70 mL 10.8 ppg) was added and resultant mixture similarly mixed for 10 min. Then, barite (300 g) was added and mixing continued for additional 30 min. Rheology properties were recorded followed by ES measurement at 150° F. Thus, the additives were evaluated at 150° F. in No 2 Red Diesel against a "Standard", control in the same medium. The results are tabularized in Table 1. Obviously, compounds 1, 3, 2 and the blend 3/4 (50/50 wt. %) gave superior ES values than the control. While there is still some advantage using more of the new additives, using more of the control leads to emulsion destabilization as is clear from the control at 2.0 g concentration). Overall, compound 3 gave a system with outstanding rheological and suspending properties when ≦0.5 g is employed in IEDF formulation.

Thus, three novel secondary emulsifier 1, 2, and 3 gave outstanding Electrical Stability (ES) values exceeding 700 V at 150° F. when added at 0.2 g concentration to an invert emulsion drilling fluid (IEDF) formulated with 10 mL of 24% (w/w) A-6332 in #2 diesel. The three secondary emulsifier 1, 2, and 3 form thermally stable IEDF (400° F.), and IEDF with fluid loss of ≦5.0 mL at 250° F.

A blend (50%, w/w) of dipalmitoyl (diethylenemethyl amine) amide and secondary emulsifier 3 gave 879 V at only 0.5 g concentration.

Both 3 and 1 are versatile, they gave stable IEDF in red diesel, yellow diesel and synthetic oil (C$_{15}$-C$_{18}$).

Importantly, 2 is synthesized from reagents (eugenol & palmitoyl chloride) made from renewable sources.

TABLE 1

Rheological & Electrical Stability Values of IEDF with Different Additives

| Additive | Conc. | 600 RPM | 300 RPM | 100 RPM | 6 RPM | 3 RPM | ES @ 150° F. | PV | YP |
|---|---|---|---|---|---|---|---|---|---|
| Blank | 24% | 35.4 | 25 | 14.7 | 7.2 | 6.6 | 567 | 10.3 | 14.7 |
| Control[a] | 0.2 g | 43.2 | 29.3 | 17.1 | 8.1 | 7.4 | 600 | 13.8 | 15.4 |
| Control[a] | 0.5 g | 38.9 | 25.7 | 14.5 | 6.3 | 5.8 | 617 | 13.2 | 12.5 |
| Control[a] | 1.0 g | 37 | 23.9 | 13.1 | 5.3 | 4.8 | 615 | 13 | 10.9 |
| Control[a] | 2.0 g | 34.5 | 21.5 | 11 | 3.9 | 3.5 | 590 | 12.9 | 8.6 |
| 3 | 0.2 g | 45.0 | 31.4 | 19.4 | 9.7 | 8.9 | 735 | 13.6 | 17.7 |
| 3 | 0.5 g | 44.1 | 30.2 | 18.4 | 9.0 | 8.4 | 834 | 13.9 | 16.3 |
| 3 | 1.0 g | 42.2 | 28.4 | 16.6 | 7.9 | 7.3 | 1035 | 13.8 | 14.6 |
| 3 | 2.0 g | 41.0 | 26.6 | 14.8 | 6.7 | 6.2 | 1147 | 14.4 | 12.2 |
| 1 | 0.2 g | 39.2 | 26.4 | 15.0 | 6.8 | 6.2 | 914 | 12.8 | 13.7 |
| 1 | 0.5 g | 40.5 | 27.1 | 15.6 | 6.9 | 6.3 | 973 | 13.4 | 13.6 |
| 1 | 1.0 g | 40.7 | 26.9 | 15.4 | 6.7 | 6.1 | 1013 | 13.8 | 13.1 |
| 1 | 2.0 g | 39.8 | 26.1 | 14.7 | 6.1 | 5.7 | 1100 | 13.7 | 12.4 |
| 2 | 0.2 g | 41.1 | 28.1 | 16.4 | 8.0 | 7.3 | 951 | 13 | 15.1 |

[a]Control is a Tall Oil based primary emulsifier product available from Expo Chemical Co., Inc

TABLE 2

Rheology, ES and Fluid Loss Data after Hot Rolling at 300° F. for 16 h

| Sample | Conc. | Condition | 600 rpm | 300 rpm | 200 rpm | 100 rpm | 6 rpm | 3 rpm | ES (V) | Fluid Loss (mL) |
|---|---|---|---|---|---|---|---|---|---|---|
| A-6332[a] | 50% | Before Hot Rolling | 33 | 19 | 14 | 9 | 3 | 2 | 767.75 | |
| | | After Hot Rolling | 34 | 20 | 14 | 9 | 3 | 2 | 564.75 | 5 |
| A-6332/3 | 24%/1 g | Before Hot Rolling | 32 | 20 | 15 | 10 | 3 | 3 | 664 | |
| | | After Hot Rolling | 39 | 23 | 17 | 12 | 4 | 4 | 646.25 | 4 |
| A-6332/3 | 24%/2 g | Before Hot Rolling | 34 | 21 | 15 | 11 | 4 | 3 | 652 | |
| | | After Hot Rolling | 35 | 21 | 15 | 10 | 3 | 3 | 618.5 | 4 |
| A-6332/1 | 24%/1 g | Before Hot Rolling | 33 | 20 | 14 | 10 | 3 | 3 | 566.25 | |
| | | After Hot Rolling | 46 | 29 | 23 | 17 | 6 | 5 | 581 | 5 |
| A-6332/1 | 24%/2 g | Before Hot Rolling | 34 | 21 | 15 | 11 | 3 | 3 | 512 | |
| | | After Hot Rolling | 51 | 33 | 26 | 19 | 7 | 6 | 531.75 | 5 |
| A-6332 | 24% | Before Hot Rolling | 34 | 21 | 15 | 10 | 3 | 3 | 545 | |
| | | After Hot Rolling | 47 | 31 | 25 | 17 | 6 | 5 | 489.5 | 5 |

[a]A-6332 primary (also employed secondary) emulsifier available from Weatherford International

TABLE 3

Electrical Stability (V) Values of Additives in Diesels & Synthetic Base Fluids

| Sample | Conc. | Yellow Diesel | Red Diesel | C$_{15}$-C$_{18}$ |
|---|---|---|---|---|
| A-6332 | 50% | 845.75 | 1205.25 | 803.75 |
| A-6332/3 | 24%/1 g | 659.5 | 1082.5 | 703 |
| A-6332/3 | 24%/2 g | 697.75 | 1083.75 | 674 |
| A-6332/1 | 24%/1 g | 534.5 | 845.25 | 475.25 |
| A-6332/1 | 24%/2 g | 541 | 855.5 | 513 |
| A-6332 | 24% | 503.75 | 847.75 | 549 |

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. An inverted emulsion drilling fluid composition comprising:
   a continuous phase comprising an organic liquid base,
   a discontinuous phase comprising an aqueous liquid,
   an emulsifying system, a weight material, and
a viscosifying agent,
where the emulsifying system comprises a primary emulsifier or a plurality of primary emulsifiers, and a secondary emulsifier or a plurality of secondary emulsifiers, where the secondary emulsifiers comprise alkyl, aryl esters, where the alkyl group, designated $R^1$, is a carbyl group having between about 10 and about 40 carbon atoms and the aryl group includes one or more substituents, where the substituents include a halogen atom, R group, $SO_3R^3$ group, $OPO_2R^3$ group, $OPO_3R^3$ group, $NHR^2$ group, $SiH_2R^2$ group, $PHR^2$ group, $SR^2$ group or $OR^2$ group, where R is a carbyl group having between about 1 and about 40 carbon atoms, $R^3$ is a hydrogen atom or a carbyl group having between 1 and 12 carbon atoms, $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$ or $R^3$.

2. The composition of claim 1, wherein the secondary emulsifiers are compounds of the general formula (I):

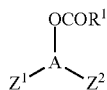

where (a) A is an aryl group having between 5 and 20 carbon atoms, (b) $R^1$ is a carbyl group having between about 10 and about 40 carbon atoms, (c) $Z^1$ is a halogen atom, R group, $SO_3R^3$ group, $OPO_2R^3$ group, or $OPO_3R^3$ group, where R is a carbyl group having between about 1 and about 40 carbon atoms and $R^3$ is a hydrogen atom or a carbyl group having between 1 and 12 carbon atoms, and (d) $Z^2$ is a hydrogen atom, $NHR^2$ group, $SiH_2R^2$ group, $PHR^2$ group, $SR^2$ group or $OR^2$ group, where $R^2$ is a carbyl group having between about 1 and 40 carbon atoms, and where one or more of the carbon atoms in A, R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for A, R, $R^1$, $R^2$ or $R^3$.

3. The composition of claim 2, wherein the secondary emulsifiers are compounds of the general formulas (II-VI):

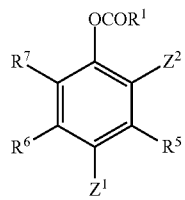

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, (c) $Z^2$ is a hydrogen atom, $NHR^2$ group, $OR^2$ group, $SiH_2R^2$ group, $PHR^2$ group, or $SR^2$ group, where $R^2$ is a carbyl group having between about 1 and 40 carbon atoms, (d) $R^5$ is a hydrogen atom or a carbyl group, (e) $R^6$ is a hydrogen atom or a carbyl group, and (f) $R^7$ is a hydrogen atom or a carbyl group, where the carbyl group have between 1 carbon atoms and about 10 carbon atoms, and where one or more of the carbon atoms in R, $R^1$, $R^2$, $R^5$, $R^6$, or $R^7$ can be replaced by B, N, O, Si, P, S, Ge and/or mixtures thereof and one or more of the hydrogen atoms in R, $R^1$, $R^2$, $R^5$, $R^6$, or $R^7$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$, $R^5$, $R^6$, or $R^7$;

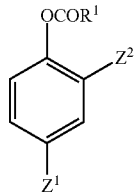

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, and (c) $Z^2$ is a hydrogen atom, $NHR^2$ group, $OR^2$ group, $SiH_2R^2$ group, $PHR^2$ group, or $SR^2$ group, where $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$ and $R^3$;

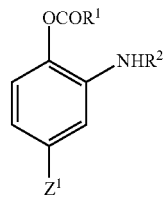

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, (c) $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and $R^4$ can be a alkyl, aryl, alkylaryl or arylalkyl group having between 1-20 carbon atoms where one or more carbon or hydrogen atom can be replaced as set forth for R, $R^1$, $R^2$ and $R^3$;

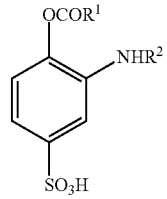

where (a) $R^1$ is a carbyl group having between about 10 and about 40 carbon atoms, (b) $R^2$ is a carbyl group having between about 1 and 40 carbon atoms, and where one or more of the carbon atoms in $R^1$ or $R^2$ can be replaced by B, N, O, Si, P, S, Ge, and/or mixtures thereof and where one or more of the hydrogen atoms in $R^1$ or $R^2$ can be replaced by F, Cl, Br, I, $CONR_2^4$, $COOR^4$, $OR^4$, $NR_2^4$, $SR^4$, $PR_2^4$, and/or mixtures thereof and $R^4$ can be a alkyl, aryl, alkylaryl or arylalkyl group having between 1-20 carbon atoms where one or more carbon or hydrogen atom can be replaced as set forth for $R^1$ or $R^2$; or

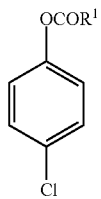

(VI)

where $R^1$ is a carbyl group having between about 10 and about 40 carbon atoms and where one or more of the carbon atoms in $R^1$ can be replaced by B, N, O, Si, P, S, Ge, and/or mixtures thereof and one or more of the hydrogen atoms in $R^1$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for $R^1$.

4. The composition of claim 1, wherein the organic liquid base is selected from the group consisting of diesel oil, mineral oil, ester, poly-alpha-olefin, mono-ether, di-ether, linear alkyl benzene and mixtures thereof.

5. A method of drilling a subterranean well with an invert emulsion drilling fluid comprising:
formulating the invert emulsion drilling fluid comprising:
a continuous phase comprising an organic liquid base,
a discontinuous phase comprising an aqueous liquid,
an emulsifying system,
a weight material, and
a viscosifying agent,
where the emulsifying system comprises a primary emulsifier or a plurality of primary emulsifiers, and a secondary emulsifier or a plurality of secondary emulsifiers, where the secondary emulsifiers comprise alkyl, aryl esters, where the alkyl group, designated $R^1$, is a carbyl group having between about 10 and about 40 carbon atoms and the aryl group includes one or more substituents, where the substituents include a halogen atom, R group, $SO_3R^3$ group, $OPO_2R^3$ group, $OPO_3R^3$ group, $NHR^2$ group, $SiH_2R^2$ group, $PHR^2$ group, $SR^2$ group or $OR^2$ group, where R is a carbyl group having between about 1 and about 40 carbon atoms, $R^3$ is a hydrogen atom or a carbyl group having between 1 and 12 carbon atoms, $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$ or $R^3$, and drilling the well with the invert emulsion drilling fluid.

6. The method of claim 5, wherein the secondary emulsifiers are compounds of the general formula (I):

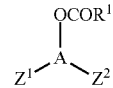

where (a) A is an aryl group having between 5 and 20 carbon atoms, (b) $R^1$ is a carbyl group having between about 10 and about 40 carbon atoms, (c) $Z^1$ is a halogen atom, R group, $SO_3R^3$ group, $OPO_2R^3$ group, or $OPO_3R^3$ group, where R is a carbyl group having between about 1 and about 40 carbon atoms and $R^3$ is a hydrogen atom or a carbyl group having between 1 and 12 carbon atoms, and (d) $Z^2$ is a hydrogen atom, $NHR^2$ group, $SiH_2R^2$ group, $PHR^2$ group, $SR^2$ group or $OR^2$ group, where $R^2$ is a carbyl group having between about 1 and 40 carbon atoms, and where one or more of the carbon atoms in A, R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for A, R, $R^1$, $R^2$ or $R^3$.

7. The method of claim 6, wherein the secondary emulsifiers are compounds of the general formulas (II-VI):

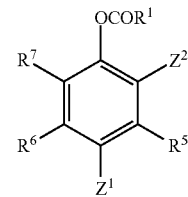

where (a) $R^1$ is a carbyl group having between about 10 and about 40 carbon atoms, (b) $Z^1$ is a halogen atom, R group, $SO_3 12^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, (c) $Z^2$ is a hydrogen atom, $NHR^2$ group, $OR^2$ group, $SiH_2R^2$ group, $PHR^2$ group, or $SR^2$ group, where $R^2$ is a carbyl group having between about 1 and 40 carbon atoms, (d) $R^5$ is a hydrogen atom or a carbyl group, (e) $R^6$ is a hydrogen atom or a carbyl group, and (f) $R^7$ is a hydrogen atom or a carbyl group, where the carbyl group have between 1 carbon atoms and about 10 carbon atoms, and where one or more of the carbon atoms in R, $R^1$, $R^2$, $R^5$, $R^6$, or $R^7$ can be replaced by B, N, O, Si, P, S, Ge and/or mixtures thereof and one or more of the hydrogen atoms in R, $R^1$, $R^2$, $R^5$, $R^6$, or $R^7$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$, $R^5$, $R^6$, or $R^7$;

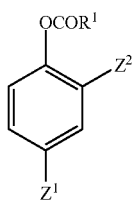

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, and (c) $Z^2$ is a hydrogen atom, $NHR^2$ group, $OR^2$ group, $SiH_2R^2$ group, $PHR^2$ group, or $SR^2$ group, where $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$ and $R^3$;

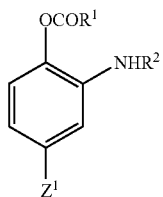

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, (c) $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and $R^4$ can be a alkyl, aryl, alkylaryl or arylalkyl group having between 1-20 carbon atoms where one or more carbon or hydrogen atom can be replaced as set forth for R, $R^1$, $R^2$ and $R^3$;

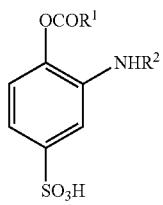

where (a) $R^1$ is a carbyl group having between about 10 and about 40 carbon atoms, (b) $R^2$ is a carbyl group having between about 1 and 40 carbon atoms, and where one or more of the carbon atoms in $R^1$ or $R^2$ can be replaced by B, N, O, Si, P, S, Ge, and/or mixtures thereof and where one or more of the hydrgeon atoms in $R^1$ or $R^2$ can be replaced by F, Cl, Br, I, $CONR_2^4$, $COOR^4$, $OR^4$, $NR_2^4$, $SR^4$, $PR_2^4$, and/or mixtures thereof and $R^4$ can be a alkyl, aryl, alkylaryl or arylalkyl group having between 1-20 carbon atoms where one or more carbon or hydrogen atom can be replaced as set forth for $R^1$ or $R^2$;

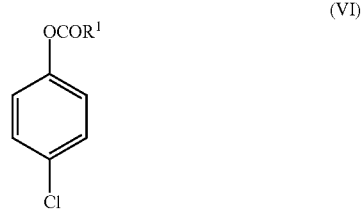

where $R^1$ is a carbyl group having between about 10 and about 40 carbon atoms and where one or more of the carbon atoms in $R^1$ can be replaced by B, N, O, Si, P, S, Ge, and/or mixtures thereof and one or more of the hydrogen atoms in $R^1$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for $R^1$.

8. The method of claim 5, wherein the organic liquid base is selected from the group consisting of diesel oil, mineral oil, ester, poly-alpha-olefin, mono-ether, di-ether, linear alkyl benzene and mixtures thereof.

9. A secondary emulsifier composition comprising:
one or a plurality of a secondary emulsifier or a plurality of secondary emulsifiers, where the secondary emulsifiers comprise alkyl, aryl esters, where the alkyl group, designated $R^1$, is a carbyl group having between about 10 and about 40 carbon atoms and the aryl group includes one or more substituents, where the substituents include a halogen atom, R group, $SO_3R^3$ group, $OPO_2R^3$ group, $OPO_3R^3$ group, $NHR^2$ group, $SiH_2R^2$ group, $PHR^2$ group, $SR^2$ group or $OR^2$ group, where R is a carbyl group having between about 1 and about 40 carbon atoms, $R^3$ is a hydrogen atom or a carbyl group having between 1 and 12 carbon atoms, $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$ or $R^3$.

10. The composition of claim 9, wherein the secondary emulsifiers are compounds of the general formula (I):

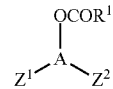

where (a) A is an aryl group having between 5 and 20 carbon atoms, (b) $R^1$ is a carbyl group having between about 10 and about 40 carbon atoms, (c) $Z^1$ is a halogen atom, R group, $SO_3R^3$ group, $OPO_2R^3$ group, or $OPO_3R^3$ group, where R is a carbyl group having between about 1 and about 40 carbon atoms and $R^3$ is a hydrogen atom or a carbyl group having between 1 and 12 carbon atoms, and (d) $Z^2$ is a hydrogen atom, $NHR^2$ group, $SiH_2R^2$ group, $PHR^2$ group, $SR^2$ group or $OR^2$ group, where $R^2$ is a carbyl group having between about 1 and 40 carbon atoms, and where one or more of the carbon atoms in A, R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for A, R, $R^1$, $R^2$ or $R^3$.

11. The composition of claim 10, wherein the secondary emulsifiers are compounds of the general formulas (II-VI):

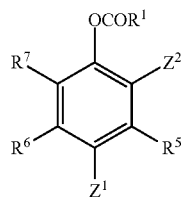

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, (c) $Z^2$ is a hydrogen atom, $NHR^2$ group, $OR^2$ group, $SiH_2R^2$ group, $PHR^2$ group, or $SR^2$ group, where $R^2$ is a carbyl group having between about 1 and 40 carbon atoms, (d) $R^5$ is a hydrogen atom or a carbyl group, (e) $R^6$ is a hydrogen atom or a carbyl group, and (f) $R^7$ is a hydrogen atom or a carbyl group, where the carbyl group have between 1 carbon atoms and about 10 carbon atoms, and where one or more of the carbon atoms in R, $R^1$, $R^2$, $R^5$, $R^6$, or $R^7$ can be replaced by B, N, O, Si, P, S, Ge and/or mixtures thereof and one or more of the hydrogen atoms in R, $R^1$, $R^2$, $R^5$, $R^6$, or $R^7$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$, $R^5$, $R^6$, or $R^7$;

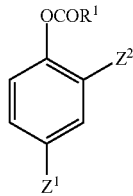

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, and (c) $Z^2$ is a hydrogen atom, $NHR^2$ group, $OR^2$ group, $SiH_2R^2$ group, $PHR^2$ group, or $SR^2$ group, where $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for R, $R^1$, $R^2$ and $R^3$;

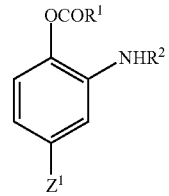

where (a) $R^1$ is a carbyl group having between about 10 and about 40 carbon atoms, (b) $Z^1$ is a halogen atom, R group, $SO_3R^3$ group, $OPO_2R^3$ group, or $OPO_3R^3$ group, where R is a carbyl group having between about 1 and about 40 carbon atoms and where $R^3$ is a hydrogen atom or a carbyl group having between 1 and 12 carbon atoms, (c) $R^2$ is a carbyl group having between about 1 and 40 carbon atoms, and where one or more of the carbon atoms in R, $R^1$, $R^2$ or $R^3$ can be replaced by B, N, O, Si, P, S, Ge and/or mixtures thereof and one or more of the hydrogen atoms in R, $R^1$, $R^2$ or $R^3$ can be replaced by F, Cl, Br, I, $CONR_2^4$, $COOR^4$, $OR^4$, $NR_2^4$, $SR^4$, $PR_2^4$, and/or mixtures thereof and $R^4$ can be a alkyl, aryl, alkylaryl or arylalkyl group having between 1-20 carbon atoms where one or more carbon or hydrogen atom can be replaced as set forth for R, $R^1$, $R^2$ and $R^3$;

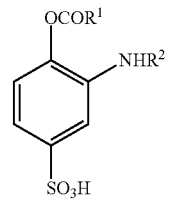

where (a) $R^1$ is a carbyl group having between about 10 and about 40 carbon atoms, (b) $R^2$ is a carbyl group having between about 1 and 40 carbon atoms, and where one or more of the carbon atoms in $R^1$ or $R^2$ can be replaced by B, N, O, Si, P, S, Ge, and/or mixtures thereof and where one or more of the hydrogen atoms in $R^1$ or $R^2$ can be replaced by F, Cl, Br, I, $CONR_2^4$, $COOR^4$, $OR^4$, $NR_2^4$, $SR^4$, $PR_2^4$, and/or mixtures thereof and $R^4$ can be a alkyl, aryl, alkylaryl or arylalkyl group having between 1-20 carbon atoms where one or more carbon or hydrogen atom can be replaced as set forth for $R^1$ or $R^2$;

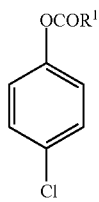 (VI)

where $R^1$ is a carbyl group having between about 10 and about 40 carbon atoms and where one or more of the carbon atoms in $R^1$ can be replaced by B, N, O, Si, P, S, Ge, and/or mixtures thereof and one or more of the hydrogen atoms in $R^1$ can be replaced by F, Cl, Br, I, $CONR_2^4$, $COOR^4$, $OR^4$, $NR_2^4$, $SR^4$, $PR_2^4$, and/or mixtures thereof and where $R^4$ can be a alkyl, aryl, alkylaryl or arylalkyl group having between 1-20 carbon atoms where one or more carbon or hydrogen atom can be replaced as set forth for $R^1$.

* * * * *